United States Patent [19]
Doyle

[11] Patent Number: 6,073,007
[45] Date of Patent: Jun. 6, 2000

[54] WIRELESS FLEET COMMUNICATIONS SYSTEM FOR PROVIDING SEPARABLE COMMUNICATIONS SERVICES

[75] Inventor: Thomas F. Doyle, San Diego, Calif.

[73] Assignee: Qualcomm Incorporated, San Diego, Calif.

[21] Appl. No.: 08/899,901

[22] Filed: Jul. 24, 1997

[51] Int. Cl.[7] .................................................. H04M 1/65
[52] U.S. Cl. ...................... 455/412; 455/401; 379/210
[58] Field of Search ................................ 455/507, 508, 455/509, 515, 516, 518, 519, 417, 466, 520; 379/58, 59, 201, 204, 205, 210, 211, 214, 212; 370/340, 327

[56] References Cited

U.S. PATENT DOCUMENTS

| | | | |
|---|---|---|---|
| 4,723,264 | 2/1988 | Sasuta et al. | 379/58 |
| 5,465,386 | 11/1995 | Barnes et al. | 455/15 |
| 5,473,667 | 12/1995 | Neustein | 379/57 |
| 5,544,229 | 8/1996 | Creswell et al. | 379/67 |
| 5,561,706 | 10/1996 | Fenner | 379/60 |
| 5,717,830 | 2/1998 | Sigler et al. | 455/426 |

FOREIGN PATENT DOCUMENTS 9629831  9/1996  WIPO ................. H04Q 7/22

OTHER PUBLICATIONS

Beurel, B., "Satellite Messaging Systems", vol. 15, Jan. 1, 1993, pp. 103–108.

*Primary Examiner*—Wellington Chin
*Assistant Examiner*—Pablo N. Tran
*Attorney, Agent, or Firm*—Russell B. Miller; Brian S. Edmonston; Thomas M. Thibault

[57] ABSTRACT

A method and apparatus for providing personal and business mobile wireless communications service is described. A message is received having a message type. Message separability and cost allocation is performed based on the message type. The message is processed when the message is a fleet message, and the message is forwarded to a message management center when the message is a personal message. Once the message is forwarded, it is deleted. In one embodiment of the invention, the messages are transmitted via a wireless satellite link between a mobile communications terminal and a network management system. A fleet computer receives the messages from the network management system and, after determining whether they are personal or fleet messages, processes them accordingly.

20 Claims, 3 Drawing Sheets

WIRELESS FLEET COMMUNICATIONS SYSTEM FOR PROVIDING SEPARABLE COMMUNICATIONS SERVICES

BACKGROUND OF THE INVENTION

I. Field of the Invention

The present invention relates to mobile communication. More particularly, the present invention relates to a novel and improved method and apparatus for providing separable personal and business mobile wireless communications service using a wireless fleet communications system.

II. Description of the Related Art

Wireless fleet communications systems allow the vehicles in a commercial vehicle fleet (typically tractor-trailer trucks) to stay in communication with a central management office using highly mobile wireless satellite links. The wireless links are formed by radio frequency (RF) signals relayed between mobile communications terminals (MCT) and a hub using an earth orbiting satellite. A system and method for implementing a wireless fleet management system is described in U.S. Pat. No. 4,979,170 entitled "ALTERNATING SEQUENTIAL HALF DUPLEX COMMUNICATION SYSTEM" assigned to the assignee of the present invention and incorporated herein by reference. The MCTs are typically located within the fleet vehicles (tractor-trailer trucks) and are typically comprised of a digital computer combined with a RF transceiver system. An MCT typically includes a keyboard or other user input device and a display system such as and LCD.

Generally, business related communications are conducted using a wireless fleet communication system. Such business related communications include the load status, location and condition of the fleet vehicle or driver, and instructions to the fleet driver as to the next desired destination. This information enables a central management office to better asses the state of, and control, its vehicle fleet so as to best use fleet resources. Typically, transmitting this type of information in a mobile fashion reduces the need for the vehicle drivers to stop, and therefore increases fleet use efficiency.

While conducting business related communications using a wireless fleet communications system reduces the number of stops necessary to make business related calls, fleet drivers must also stop on occasion to make important personal calls. For example, a fleet driver may need to take care of financial or family health matters, or inquire about family news. Making such personal calls reduces "on road" time, and therefore decreases fleet utilization. In addition, it is difficult for the driver's family to reach him or her if something should arise needing immediate contact. Sometimes the family must contact the fleet's dispatcher and request that the dispatcher contact the driver to request that he call the family. This is a distraction to the fleet's operations staff, and is unsettling to the family because of the lack of privacy due to the dispatcher's involvement.

While fleet drivers could transmit a personal message to the central management office using the wireless fleet management system, these personal communications will have to be viewed and relayed by the management personnel. This is undesirable both from the fleet driver's perspective, due to privacy considerations, and from the fleet management's perspective, as processing and relaying such message is time consuming. Also, since the drivers' personal communications are not separated from the fleet's, the fleet would bear the cost of the drivers' messages or would need to create an administrative system to deduct the costs from driver earnings or otherwise collect from drivers. Thus, the present invention is directed to further increasing fleet utilization, as well as providing additional convenience to the fleet drivers, without significantly increasing cost to fleet management, by providing both private and business communications services in a wireless fleet communications system.

SUMMARY OF THE INVENTION

The present invention is a novel and improved method and apparatus for providing separable personal and business mobile wireless communications services using a wireless fleet management system. A message is received having a certain "type" designation, which is used to associate it with message privacy level and billing rules. The type designation is preferably provided in a bit field within the message. For example, the type could be specified by the selection of a particular macro number. The message is processed within the wireless fleet management system when the message is a fleet message, and at a message management center when said message is a personal message. The message is preferably deleted after being forwarded to the message management center. Also, the costs of transmitting personal type messages is billed to the driver or the message management center. In one embodiment of the invention, the messages are transmitted via a wireless satellite link between a mobile communications terminal and a network management system. A fleet computer receives the messages from the network management system and, after determining whether they are personal or fleet messages, processes them as described.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
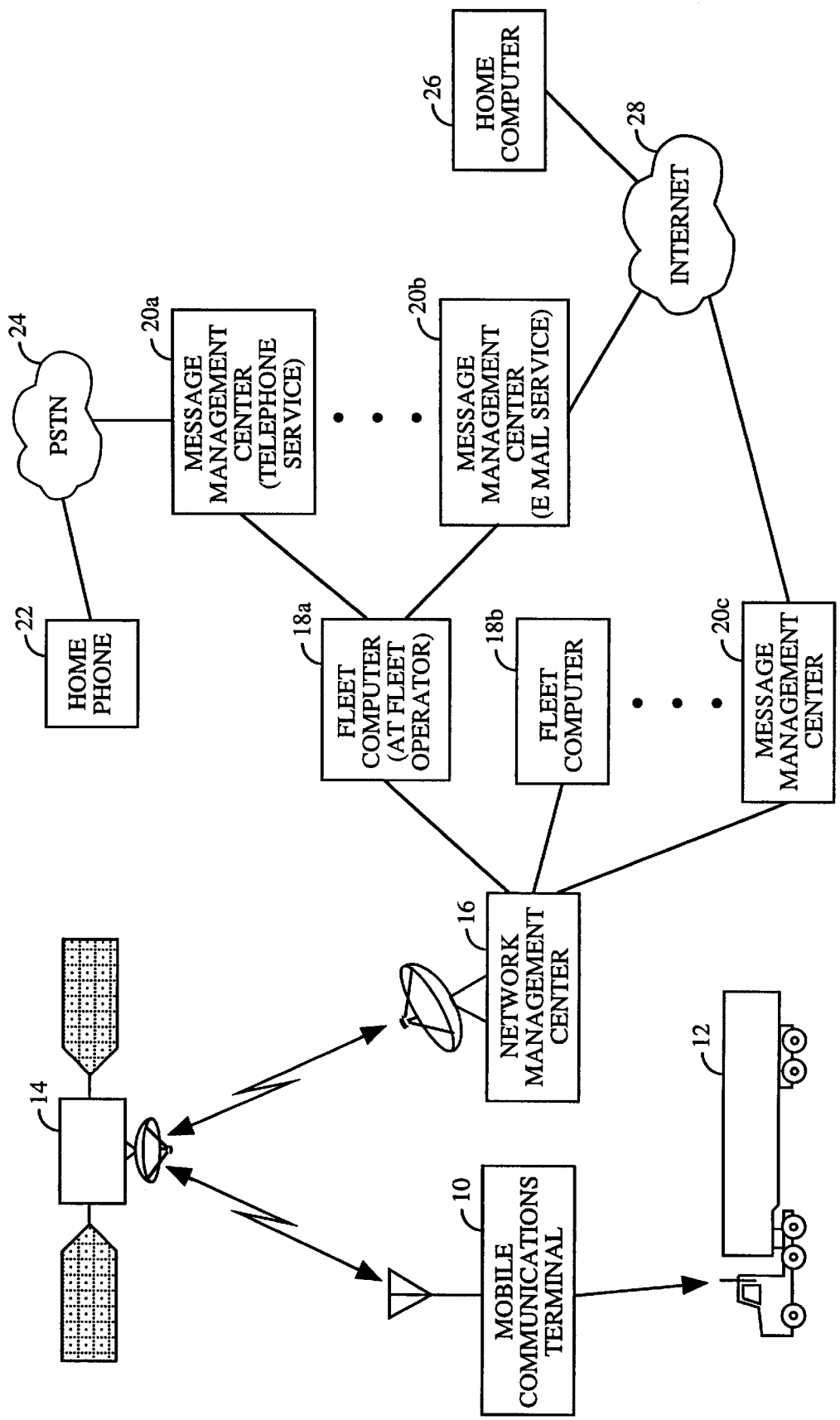
FIG. 1 is a block diagram of a fleet management system configured in accordance with one embodiment of the invention.

FIG. 1 is a block diagram of a wireless fleet communications systems configured in accordance with one embodiment of the invention. Mobile communications terminal (MCT) 10 engages in bi-directional communication with network management center (NMC) 16 by relaying RF signals via satellite 14. NMC 16 is preferable comprised of a computer or computers coupled to a RF transceiver system. Although only one MCT 10 is shown, the wireless fleet communications system is usually comprised of many MCTs 10, generally located within a feet vehicle 12. Relaying the RF signals via satellite 14 allows communications to take place between MCT 10 and NMC 16 without a line of site connection, and therefore over a large geographical area. While the use of a satellite link is preferred due to the large coverage area provided, other wireless links may also be used such the links provided in a cellular telephone system.

NMC 16 is coupled to fleet computers 18a and 18b, as well as other fleet computers not shown for ease of drawing. The connections can be formed in various ways including a periodic dial up connection, dedicated wireline link, local area network or other wireless links. Fleet computers 18 are preferably conventional computer systems such as PC compatible computers or mini or mainframe systems configured with software for processing messages from NMC 16. Additionally, fleet computers 18 are typically located at the corresponding fleet headquarters, while NMC 16 is located at the wireless fleet communications service provider. Fleet management is typically a customer of the wireless fleet communication service provider.

Fleet computer 18a is connected to message management centers (MMC) 20a and 20b via dial-up or dedicated connection. MMC's 20 are preferably run by a third party communications service provider such as an internet service provider (ISP), paging or other telecommunications service provider. In the exemplary embodiment shown in FIG. 1, MMC 20a is a telephone service provider such as a local exchange carrier (LEC) coupled to home telephone 22 via public switch telephone network (PSTN) 24. MMC 20b is an internet service provider coupled to home computer 26 using the internet 28.

During operation, MCT 10 transmits both personal and business messages to NMC 16, as selected by the input of a fleet driver. In an exemplary embodiment of the invention, MCT 10 displays a set of message options, or "macros," that may be selected by the fleet driver via input into a keyboard that is part of MCT 10. One of the macros specifies the transmission of a personal message, and if selected requests the address to which the personal message is sent. Other macros select business messages. Once selected, the message is transmitted to NMC 16 via the wireless link.

Preferably, the type of message being transmitted is indicated within that message. That is, whether the message is a personal or business message is indicated within the message itself, using a message type field or other message type indication information. Including message type information provides message separability between personal messages and business related fleet messages. In one embodiment of the invention, the message type is preferably indicated within a macro number field contained in the message. Certain macro numbers are designated for personal messages and other macro numbers are designated for business messages. Also, the message preferably contains a fleet identification field indicating, or allowing identification of, the particular fleet with which the message is associated. If the message is a personal message, the identify of the fleet driver is preferably indicated in a driver ID field. The fleet driver may be indicated implicitly by specifying the serial number or other identification information of an MCT 10 assigned to a particular driver. The message may also contain a personal identification number (PIN) known only to the fleet driver to ensure that it is the true and correct fleet driver transmitting the message. Various other methods for indicating the message type, fleet identify and message originator (driver) identity will be apparent. Additionally, the destination is indicated within the message using one or more destination fields.

NMC 16 receives a message and determines the associated fleet using the fleet indication field and the message type using the message type field. In a first exemplary processing, when the message is associated with the fleet corresponding to fleet computer 18a, the message is forwarded to fleet computer 18a. Additionally, the messages are separated based on the message type. If the message is a fleet message, then the cost of transmitting the message is billed to the fleet management corresponding to fleet computer 18a. If the message is a personal message, the cost of transmitting the message is billed to the fleet driver, or the fleet driver's selected communications service provider. Thus, message separability is provided using the message type field.

Upon receipt of the message, fleet computer 18a also examines the message type field to determine if the message is a fleet message or a personal message. The messages are then separated and processed based on the message type. If the message is a fleet message, it is preferably processed by fleet computer 18a. Such processing can include notification that the message has been received, display of the message, so that management personal may view it, storage of the message for recording purposes, or a combination thereof.

If the message is a personal message, fleet computer 18a performs a service provider look-up whereby the preferred service provider of the corresponding fleet driver is determined based on the driver ID field. The preferred service providers for a set of particular drivers is preferably stored in a database maintained within fleet computer 18a (not shown), although other methods and locations for such storage are consistent with the use of the present invention. Once the preferred service provider is determined, the message is forwarded to the associated MMC 20, and the message is then deleted from fleet computer 18a. Fleet computer also performs message format conversion between the message format used by the fleet communication system and the message format used by the internet and MMC 20 (for example TCP/IP) before forwarding the message.

If mobile communications terminal 10 provides voice communications service, the service provider maybe a local exchange carrier (LEC) corresponding to MMC 20a. A LEC is generally the local telephone service provider. Upon receipt of the voice message from fleet computer 18a, MMC 20a stores the voice message until the voice message mail box is checked using home phone 22. Thus, the personal voice message has been delivered using MCT 10 without requiring the fleet driver to stop fleet vehicle 12. Thus, the number of necessary stops is reduced which, in turn, increases fleet use efficiency.

Similarly, if MCT 10 provides data messaging service such as e-mail, the service provider maybe an internet service provider as shown for MMC 20b. In this case, fleet computer 18a forwards the data message to MMC 20b and then deletes the message. Upon receipt of the message from fleet computer 18a, MMC 20b either forwards the message to home computer 26 via internet 28, or stores the message until home computer 26 comes on line. Home computer 28 may also access MMC 29b using a direct dial-up connection over PSTN 24. Once again, the personal message has been delivered using the wireless link, and therefore without requiring the fleet driver to stop fleet vehicle 12, while maintaining the confidentiality of the message and correctly allocating the cost of that message transmission. Thus, the fleet driver has been provided with additional convenience and value while placing minimal burden on the fleet management.

An alternative method for processing messages is illustrated by the processing associated with messages from a fleet vehicle associated with fleet computer 18b. Upon determining that a message is associated with fleet computer 18b, NMC 16 further determines the message type.

If the message is a fleet message it is forwarded to fleet computer 18b, and the cost of the message is billed to fleet management by creating a billing record in a billing database. If the message is a personal message, it is forwarded directly to MMC 20c, which can be various types of systems including an internet service provider or a LEC as described above. Additionally, the cost of the message is billed to the fleet driver by entry of a billing record in the billing database. MMC 20c stores the message and routes it to a home computer 28 whenever the home computer 28 comes on line. Home computer 28 may also log directly into message management center 20c via the PSTN 24 in alternative embodiments of the invention.

Billing can be performed via a debit account whereby the fleet driver maintains a balance with either fleet management, the wireless communications service provider, or the message management center. When a personal message is processed the debit account is depleted by the cost of the message. A credit account may be substituted for the debit account. When a personal message is transmitted an entry is made in the credit account. At the end of a month or some other period of time, the entries are summed, and a bill sent to the fleet driver. On line transfer of funds may be performed as well, where funds are transferred from a remotely located account in response to the transmission of a personal message.

In still another embodiment of the invention, fleet management pays the cost of transmitting personal messages, and the fleet driver reimburses fleet management. Of course, the fleet driver could be billed directly by the wireless telecommunications service provider operating the network management center, or the network service provider could be billed by the wireless telecommunications service provider. Also, the determination of proper billing does not have to be performed at the same location where message routing is performed.

By having NMC 16 forward personal messages directly to MMC 20c, rather than to the fleet computer as performed for fleet computer 18a, the ability to transmit both fleet and personal messages using the wireless link is provided without consuming additional processing resources of fleet computer 18b while also allowing the cost of the message to be billed correctly. This further reduces the burden placed on fleet management. Additionally, by avoiding transfer of personal message messages to fleet computer 18b, the privacy of such messages is enhanced over messages transmitted by way of fleet computer 18b and then deleted.

The present invention may also incorporate the use of address blocking, or address selection. For address blocking, fleet computer 18a or network management center 16 maintains a list of addresses for each fleet driver. Any requests to communicate with a fleet driver from an address on the blocking list are then rejected. For address selection, addresses are stored within fleet computer 18a or network management center 16 and called up by preassigned tags or "nicknames" provides by the fleet driver during transmission of the message.

Another possible method for distinguishing between personal and private messages is via the address of phone number to which the message is directed, or from which the message originates. This method is less desirable, however, in that the type service provided to each address must be predetermined. The use of a message type allows different treatment and processing of messages to be performed to any address and phone number, thus providing greater flexibility over the use of address and telephone number to determine the correct message processing.

Figure 2:
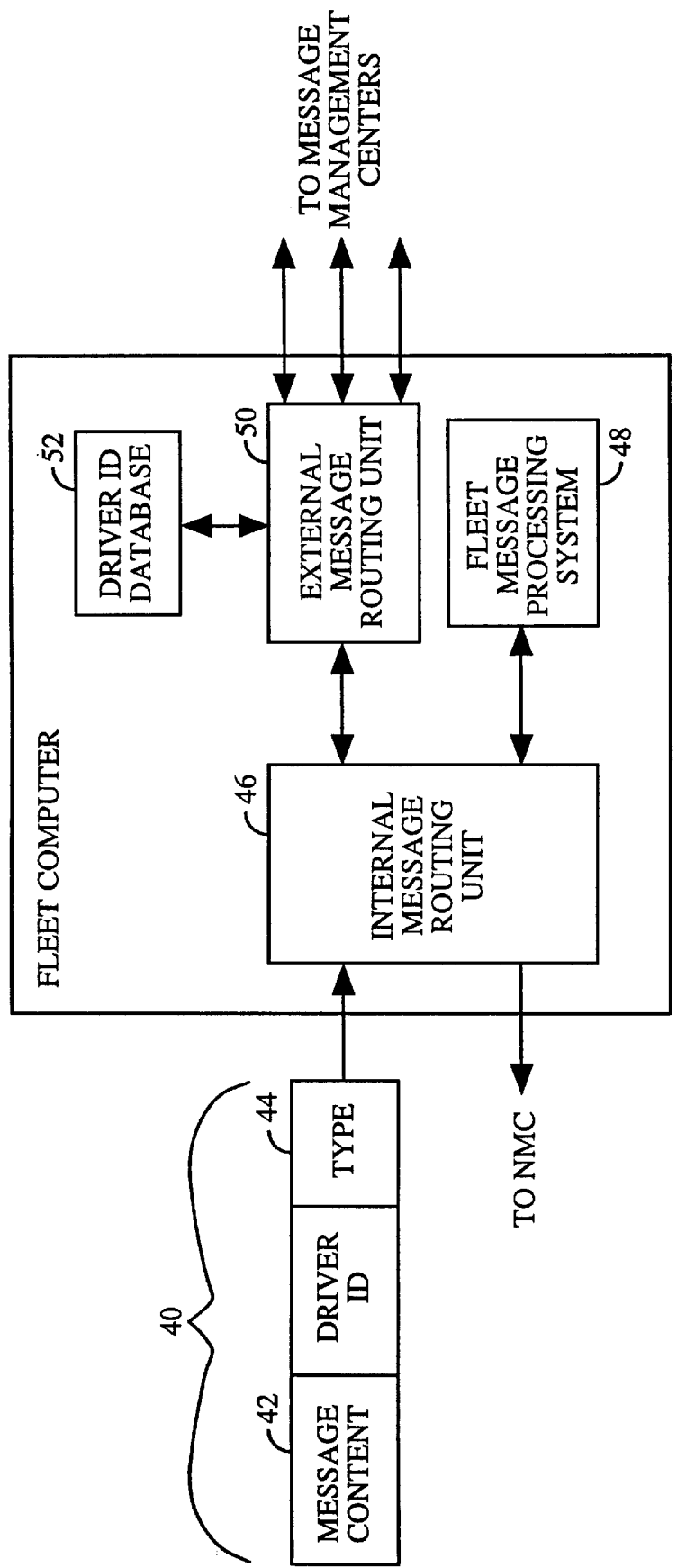
FIG. 2 is a block diagram of a fleet computer when configured in accordance with one embodiment of the invention.

FIG. 2 is a block diagram of fleet computer 18a configured in accordance with one embodiment of the invention. Data message 40 is received by fleet computer 18b by way of the wireless link and NMC 16, and includes message content 42, driver ID 41 and message type field 44. Within fleet computer 18b, internal message routing unit 46 receives data message 40 and examines privacy field 44. If message type field 44 indicates a fleet message, data message 40 is passed to fleet message processing system 48 where it is processed in accordance with normal practice including display and storage.

If message type field 44 indicates a personal message, internal message routing unit 46 passes data message 40 to external message router system 50. External message router system 50 examines the driver ID 41 and determines the preferred service provider by performing a look-up within driver ID database 52. Based of the preferred service provider, external message routing unit 50 forwards data message 40 to a particular MMC.

Figure 3:
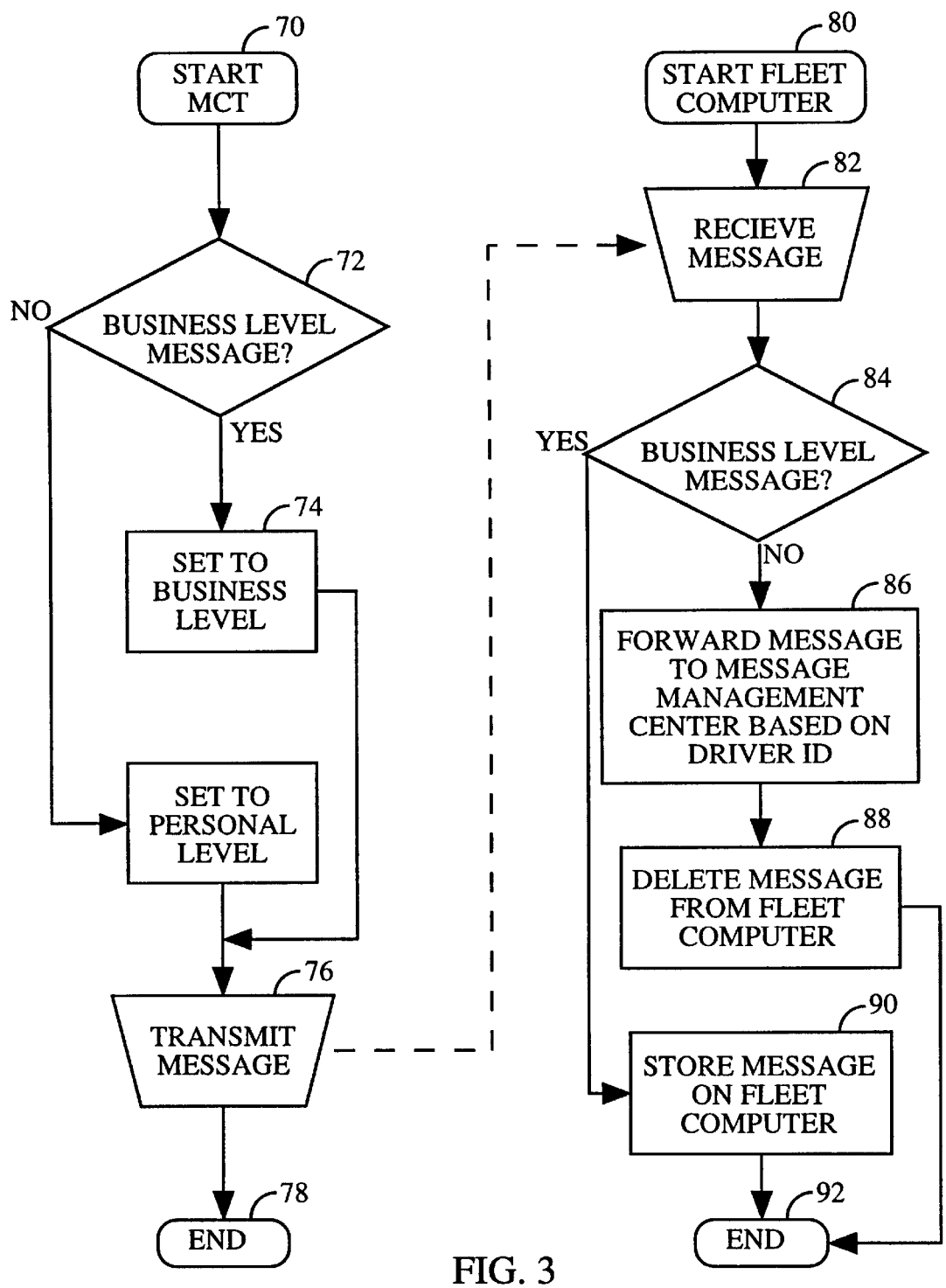
FIG. 3 is a flow diagram illustrating the operation of the wireless fleet communications system in accordance with one embodiment of the invention.

FIG. 3 is a flow diagram illustrating the steps performed by MCT 10 and fleet computer 18a when transmitting a message in accordance with one embodiment of the invention. The processing begins within MCT 10 at step 70 and at step 72 MCT 10 determines if the message is a fleet message based on the keypad on other input from the fleet driver. If so the message type field is set to fleet message at step 74, and the message is transmitted at step 76. If the message is not a fleet message, and therefore a personal message has been selected, the message type field is set to personal message at step 78, and the message is transmitted at step 76. The processing for the message within MCT 10 then terminates at step 78.

Processing within fleet computer 18b begins at step 80 and at step 82 the message is received from MCT 10 by way of the wireless link and NMC 16 of FIG. 2. At step 84, fleet computer 18b determines if the message is fleet message, and if so the message is stored and further processed on the fleet computer 18a. If the message is not fleet message the message is forwarded to a message management center selected based on the fleet driver ID at step 86, since in the described two level embodiment the message is either personal or fleet message. Affirmative testing for a personal message type may be performed in alternative embodiments of the invention, and is required for embodiments of the invention having more than two message types. At step 88 the message is deleted from fleet computer 18a, and processing of the message terminates at step 92.

Thus, a communications systems providing separable personal and business communication services that increases fleet utilization has been described. By providing an MCT 10 that transmits messages including a message type field and a driver ID field, and a fleet computer that forwards the message to a message management center if the message is a personal message, both personal and fleet message communications services are provided using the same wireless fleet communications system. The different processing also provides message privacy and correct cost allocation. Providing both fleet message and personal message communication services using the same wireless fleet communication minimizes the number of stops made by a fleet driver, and therefore increases fleet usage efficiency.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. A method for providing business message and personal message communications service to a fleet of vehicles in communication with a central station, comprising the steps of:

receiving a message by a central station, said message transmitted by a mobile communication terminal, said message having a message type field comprising either a business type or a personal type;

processing said message when said message type field comprises said business type; and forwarding said message to a message management center when said message type field comprises said personal type.

2. The method as set forth in claim 1 wherein said step of processing comprises the step of generating notification of said message.

3. The method as set forth in claim 1 wherein said step of processing comprises the step of storing said message.

4. The method as set forth in claim 1 wherein said step of processing comprises the step of displaying said message.

5. The method as set forth in claim 1 wherein said message also has a driver ID, and said step of forwarding step is further comprised of the step of selecting a message management center based on said driver ID.

6. The method as set forth in claim 1 further comprising the step of deleting said message after said step of forwarding is performed.

7. The method as set forth in claim 1 wherein said message management center is an internet service provider.

8. The method as set forth in claim 1 wherein said message management center is a local exchange carrier.

9. The method as set forth in claim 1 wherein said message management center is a paging service provider.

10. A wireless fleet communications system comprising:

a mobile communication terminal for transmitting a message to a central station, said message having a message type field, said message type field comprising either a business type or a personal type, over a wireless link to a central station; and a fleet computer for forwarding said message to a message management center when said message type field comprises said personal type and for processing said message when said message type field comprises said business type.

11. The wireless fleet communications system of claim 10 further comprising a network management system for routing said message to said fleet computer based on a driver ID contained in said message.

12. The wireless fleet communications system as set forth in claim 11 wherein said fleet computer is further for deleting said message after forwarding to said message management center.

13. The wireless fleet communications system as set forth in claim 11 wherein said network management system is an internet service provider that forwards said message to a home computer.

14. The wireless fleet communications system of claim 10 wherein said network management center is further for billing fleet management when said message type field is set to personal message and for bill a fleet driver when said message type field is set to personal message.

15. The wireless fleet communications system of claim 10 wherein said message type is selected by input into said mobile communications terminal.

16. A wireless fleet communications system comprising:

a mobile communication terminal for transmitting a message to a central station, said message having a message type field, said message type field comprising either a business type or a personal type, over a wireless link; and a network management center for receiving said message, and for forwarding said message to a message management center when said message type field comprises said personal type, and to a fleet computer when said message type field comprises said business type.

17. The wireless fleet communications system of claim 16 wherein said message has a driver ID, and said network management center is further for routing said message to one of a set of message management centers based on said driver ID.

18. The wireless fleet communications system of claim 16 wherein said message management center is an internet service provider.

19. The wireless fleet communications system of claim 16 wherein said message management center is a paging service.

20. The wireless fleet communications system of claim 16 wherein said message management center is an voice messaging service.

* * * * *